(12) United States Patent
Wendel

(10) Patent No.: US 12,487,186 B2
(45) Date of Patent: Dec. 2, 2025

(54) INSPECTION SYSTEM AND METHOD OF INSPECTION FOR SUBSTRATE CONTAINERS

(71) Applicant: Brooks Automation GmbH, Radolfzell (DE)

(72) Inventor: Alexander Wendel, Dürrheim—Unterbaldingen (DE)

(73) Assignee: BROOKS AUTOMATION (GERMANY) GMBH (DE)

( * ) Notice: Subject to any disclaimer, the term of this patent is extended or adjusted under 35 U.S.C. 154(b) by 168 days.

(21) Appl. No.: 16/619,707

(22) PCT Filed: Jun. 7, 2018

(86) PCT No.: PCT/EP2018/065089
§ 371 (c)(1),
(2) Date: Dec. 5, 2019

(87) PCT Pub. No.: WO2018/224619
PCT Pub. Date: Dec. 13, 2018

(65) Prior Publication Data
US 2020/0158661 A1    May 21, 2020

(30) Foreign Application Priority Data
Jun. 8, 2017    (EP) .................................. 17174967

(51) Int. Cl.
*G01N 21/95*    (2006.01)
*G06T 7/00*    (2017.01)
*H01L 21/67*    (2006.01)

(52) U.S. Cl.
CPC ....... *G01N 21/9501* (2013.01); *G06T 7/0002* (2013.01); *H01L 21/67288* (2013.01); *G06T 2207/30148* (2013.01)

(58) Field of Classification Search
CPC .............. G01N 21/9501; G06T 7/0002; G06T 2207/30148; H01L 21/67288; H01L 21/67265
See application file for complete search history.

(56) References Cited

U.S. PATENT DOCUMENTS

| 2002/0021837 A1 | 2/2002 | Suzuki |
| 2003/0063965 A1 | 4/2003 | Langan et al. |

(Continued)

FOREIGN PATENT DOCUMENTS

| CN | 102338990 | 2/2012 |
| JP | 2004266221 | 9/2004 |

(Continued)

OTHER PUBLICATIONS

Industrial Magnetics, "High Visibility Inspection Mirror" https://www.youtube.com/watch?v=Qhwv2NWyOpA, Feb. 10, 2016 (Year: 2016).*

(Continued)

*Primary Examiner* — Maurice C Smith
(74) *Attorney, Agent, or Firm* — Perman & Green, LLP

(57) ABSTRACT

The present disclosure relates to an inspection system configured and adapted for inspecting a substrate container or a component of a substrate container, the container or the component including a plurality of surfaces, the system including at least one mirror arranged and configured to provide a simultaneous view of at least a first one and a second one of the plurality of surfaces.

12 Claims, 3 Drawing Sheets

(56) References Cited

U.S. PATENT DOCUMENTS

| | | | |
|---|---|---|---|
| 2003/0128447 A1* | 7/2003 | Goodenough | G02B 7/1824 |
| | | | 359/882 |
| 2005/0035313 A1 | 2/2005 | Garssen et al. | |
| 2008/0013820 A1* | 1/2008 | Vertoprakhov | G06T 3/0043 |
| | | | 382/141 |
| 2010/0074514 A1 | 3/2010 | Hayashi et al. | |
| 2013/0314531 A1 | 11/2013 | Abe et al. | |
| 2015/0243612 A1 | 8/2015 | Yamamoto | |
| 2017/0280135 A1* | 9/2017 | Shroff | G06T 7/80 |

FOREIGN PATENT DOCUMENTS

| | | | | |
|---|---|---|---|---|
| JP | 2006113288 | | 4/2006 | |
| JP | 2001291054 | | 10/2019 | |
| KR | 20040020795 | | 3/2004 | |
| TW | 1515820 | | 1/2003 | |
| TW | 201643977 | | 12/2016 | |
| WO | 2016139249 | | 9/2016 | |
| WO | WO2016/139249 A1 * | | 9/2016 | H01L 21/66 |

OTHER PUBLICATIONS

Siedenader Maschinenbau, "Line Scan and area Scan Cameras for Inspection of Pharmaceutical Products" Sep. 12, 2018 (Year: 2018).*
Anastasios N. Zographos, "Line-scan system for all-round inspection of objects", 1997 (Year: 1997).*
International Search Report dated Sep. 5, 2018; International Application No. PCT/EP2018/065089.

* cited by examiner

INSPECTION SYSTEM AND METHOD OF INSPECTION FOR SUBSTRATE CONTAINERS

This application is a National Stage of International Application No. PCT/EP2018/065089, having an International Filing date of 7 Jun. 2018, which designated the United States of America, and which International Application was published under PCT Article 21(2) as WO Publication 2018/224619 A1, which claims priority from and the benefit of European Patent Application No. 17174967.4 filed on 8 Jun. 2017, the disclosures of which are incorporated herein by reference in their entireties.

BACKGROUND

1. Field

The application relates to an inspection system for determining a state of a substrate carrier or container, and a corresponding method.

2. Brief Description of Related Developments

Such carriers and containers (herein, "containers") for holding substrates (e.g., reticles, semiconductor wafers, flat panel displays, or other substrates used in the manufacture of electronic devices) usually comprise a container body, which is typically cube shaped, one of the sides of the container being provided as an opening, through which substrates can be inserted into the container body. A container additionally comprises a lid or door member adapted and configured to close this opening, thus tightly sealing the space within the container body such that, for example, a controlled atmosphere can be provided therein. In order to provide a tight sealing between container body and lid, a gasket is provided. This gasket is usually provided on the lid, but can also be arranged on the front surface of the container body, i.e. the surface surrounding the opening.

While the application refers to front opening unified pods (FOUP) as a preferred example, the present disclosure is applicable to any kind of substrate container. As a further example, front opening shipping boxes (FOSB) are mentioned.

In semiconductor wafer processing, robotic mechanisms are constantly arranging, organizing and processing wafers and wafer containers, such as a front opening unified pod (FOUP). The FOUP maybe damaged in the process (e.g. scratch, break, deform, etc.). There exists a need to efficiently inspect containers such as FOUPs for such damages and/or defects.

Substrate containers such as FOUPs are also liable to contamination, by which for example a wafer manufacturing process is rendered less effective. For this reason, it is for example of great importance that a gasket provided on a container body or lid has no defects, in order to be able to provide a controlled and uncontaminated atmosphere within the container.

In the following, whenever the term container or component, i.e. a component of such a container, for example, a container body or lid, is used, this shall refer to a substrate container and its components, i.e. a container configured and adapted to hold and/or transport substrates.

SUMMARY

According to the present disclosure, there is suggested an inspection system comprising the features of claim 1, together with a method comprising the features of claim 11.

According to the present disclosure there is suggested an inspection system configured and adapted for inspecting a substrate container or a component of a substrate container, the container or the component comprising a plurality of surfaces, the system comprising at least one mirror arranged and configured to provide a simultaneous view of at least a first one and a second one of the plurality of surfaces. Such a simultaneous viewing provides for a highly effective inspection of a substrate container regarding possible defects. In previous solutions, it was customary to view a container or a component of a container from a first side, i.e. inspecting a first surface, and then subsequently from a second side, i.e. inspecting a second surface. This required a repositioning of, for example, the container or the component, leading to longer inspection times and more cumbersome handling. Advantageously, the inspection system according to the present disclosure is adapted and configured to inspect a container or component comprising a front surface and a plurality of inner and/or outer side surfaces, and the at least one mirror is arranged to provide a simultaneous view of the front surface and at least one of the plurality of side surfaces. As an example, a front surface of a body of a container, comprising an opening through which substrates are inserted into the container body, and which interacts with a lid member adapted to sealingly close this opening, is usually provided with a seal or gasket. According to the invention, it is thus, for example, possible to view and inspect this seal or gasket from two sides simultaneously for defects. Also, the lid member may be provided with such a seal or gasket, which may be simultaneously viewed and inspected from two sides according to the present disclosure.

According to a preferred aspect of the present disclosure, the at least one mirror is provided to be movable relative to the container or the component in a translational and/or pivotable manner. This measure enables an efficient viewing of different regions of a container or component without having to move the container or component. For example, in a first mode, the mirror can be positioned to provide a simultaneous view of the front surface and a neighbouring outside surface of the container. By subsequently moving the mirror in a translational and/or pivotal manner, a simultaneous view of, for example, the front surface and an inner surface can be provided.

Advantageously, the inspection system comprises a camera configured and adapted to capture an image of a simultaneous view of at least the first one and the second one of the plurality of surfaces of the container or the component. Camera images can especially be used in connection with computer based image analysis, which constitutes a powerful tool for evaluating the state of surfaces and/or surface structures, especially defects occurring on a surface or within a surface structure. It is also possible to provide a multitude of cameras. Providing only one camera is advantageous in that costs of the system can be minimized, and at the same time handling complexity is reduced. However, it is also possible to provide the system with at least two cameras, at least one of which is adapted to provide a variable visual field. For example, a first camera can be provided which is adapted to provide a panoramic view of a complete surface or side of a container, together with a second camera for providing a variable visual field, which can be substantially smaller than that of the first camera. By means of such an arrangement, general features of a container can be detected at the same time as detailed features. A camera can be provided within a zoom-system in order to vary the size of its visual field.

According to a preferred aspect of the present disclosure, the camera is configured and adapted to capture an image of the front surface and at least one of the plurality of side surfaces of the container or the component. This allows an especially efficient and fast inspection of a container or a component, leading to reduced handling of containers during inspection.

The camera is advantageously provided as a line scan camera, which allows an effective capture of high resolution images of regions of interest. It is also advantageously possible to provide the camera as an area scan camera. Area scan cameras allow an effective and fast capture of images of regions of interest.

Advantageously, the camera is provided to be movable and thus positionable relative to the container or the component in a translational and/or pivotable manner. Especially in combination with the at least one mirror being movable in a translational and/or pivotable manner, this allows for a highly effective inspection of any surface or surface region of a container or a component. Be it noted that for certain applications such a moveability or positioning of the camera might not be necessary. Thus, inspections systems comprising cameras adapted only for pivotal movement about one, two or three axes, as well as cameras adapted only for translational movement in one, two or three directions constitute possible aspects within the scope of the present disclosure. It is also possible to provide an inspection system according to the present disclosure, in which the camera is not moveable, and, for example, fixedly attached to a mounting frame.

According to a preferred aspect, the inspection system comprises an evaluating unit adapted and configured to evaluate the state of the container or the component on the basis of at least one image captured by the camera. The evaluating unit is advantageously provided as a computer. Such an evaluating unit advantageously also comprises a controller configured and adapted to control positioning of the at least one mirror and/or camera.

Preferably, the evaluating unit is adapted and configured to provide an image analysis of the at least one image captured by the camera. As mentioned above, such an image analysis constitutes a powerful tool for evaluating the state of for example a surface of a container of component, especially for identifying any defects rendering a container or a component unusable.

The inspection system according to the present disclosure can especially be adapted and configured to inspect a front opening unified pod (FOUP), especially a body member and/or a lid member of a FOUP. In order to provide an effective handling of wafers during a wafer processing, it is of the utmost importance that FOUPs are in immaculate condition in order to avoid any kind of mishandling or contamination of wafers.

The method according to the present disclosure for inspecting a substrate container or a component of a substrate container comprising a plurality of surfaces comprises the steps of
   positioning a container or a component to be inspected in or at or in the vicinity of an inspection system comprising at least one mirror for providing a simultaneous view of a least a first one and a second one of the plurality of surfaces,
   capturing an image of the simultaneous view of the first one and the second one of the plurality of surfaces, especially using a camera, and
   evaluating the state of the container or the component, especially using an evaluation unit.

The advantages achievable when utilizing such a method essentially correspond to those as outlined above in connection with the inspection device.

Advantageously, to implement the method according to the present disclosure, an inspection system comprising at least some, especially all of the features as outlined above is used.

Expediently, the camera used in the detection system is configured and adapted to produce a digital image of an area of interest on the surface of a container, especially a FOUP, the inspection system further comprising a data processing unit adapted for processing produced digital images by means of an algorithm coupled to a memory and a processor of the data processing unit to identify the state and/or content of the container. In this connection, it is especially possible to determine damage to a FOUP, for example a broken-off or damaged feature of a FOUP, such as a gasket, a grommet or a handling flange, and also defects, such as distortions, for example due to exposure to heat or other outside influences.

Also, for example, FOUPs and other containers may be regularly subjected to a purge, for example using $N_2$ in order to prevent contamination of the containers' contents. An $N_2$ purge is effected by means of a nozzle typically provided in the base of a container. In order to prevent any contamination, the nozzle interacts with a grommet. Such a nozzle can be effectively inspected with the inspection device according to the invention.

Advantageously, the inspection system comprises at least one light source. Especially, such light sources can be positioned and/or moved into or within the inside of a container, especially a FOUP, the state and/or content of which is to be checked. In some instances, at least two light sources are used and the light sources can be independently controlled to turn on, turn off, dim, or move individual light sources to change illumination patterns on and/or within the container.

In at least one aspect, the present disclosure discloses systems and methods for determining damage and/or defects to FOUPs by scanning a visual field using a camera. One or more camera may be installed inside a visual inspection chamber of a wafer processing system, wherein one or more FOUP may be positioned. The camera may be configured to move along one or more linear guides. The movement of the camera may allow wider scanning of a particular area of interest of the FOUP. The particular area of interest may be an inner or an outer surface of the FOUP. The scanning of the particular area of interest may produce a digital image of the particular area of interest. The produced image may be used by an algorithm coupled to a memory and a processor of a data processing unit to identify damages and/or defects.

BRIEF DESCRIPTION OF THE DRAWINGS

Preferred aspects will now be described referring to the accompanying figures. Herein.

DETAILED DESCRIPTION

Figure 1:
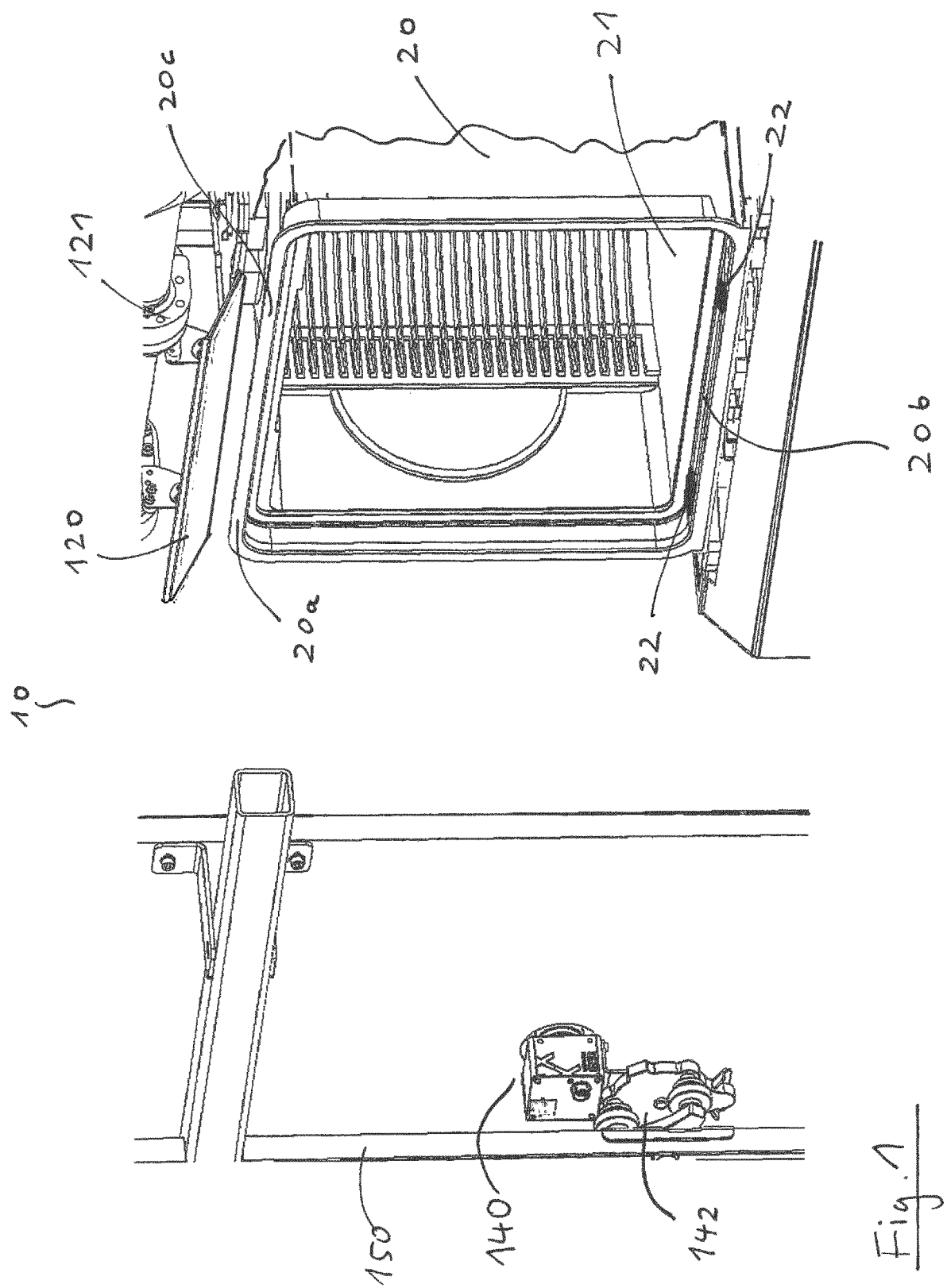
FIG. 1 shows a schematic perspective view of an embodiment of the inspection system according to the present disclosure.

Referring to FIG. 1, the inspection system, generally designated 10, is adapted to inspect a container body 20 of a container for holding substrates. In FIG. 1 as a typical example of such a container, a body 20 of a FOUP is partly shown. Container body 20 comprises a front surface 20a defining an opening of the body, through which wafers can be inserted into the interior 21 of the container body 20. The opening can be closed by means of a lid member 21, not shown in FIG. 1 but schematically shown in FIGS. 5 and 6, interacting with front surface 20a, thus enabling provision of a controlled atmosphere in the interior 21 of container body 20.

In order to provide such a controlled atmosphere in interior 21 after closing the opening with lid member 21, valve members 22 are provided in a lower inner surface 20b of container body 20. These valves, as can be seen on FIG. 1, are provided in inner surface 20b in the vicinity of front surface 20a.

Inspection system 10 comprises a camera 140 and a mirror element 120. The inspection system further comprises an evaluation unit for evaluating images captured by camera 140. The evaluation unit is not shown in FIG. 1, but schematically shown in FIGS. 2, 3 and 5 and designated with reference numeral 160.

Camera 140 is pivotably mounted on a frame 150. In order to provide pivotal movement of the camera, it is attached to a pivoting mechanism 142, which is adapted to allow pivotal motion of the camera 140 about one, two or three axes, especially about a horizontal and/or a vertical axis.

It is also possible to provide the camera 140 to be translationally moveable in one, two or three directions. For example, to achieve vertical movement, camera 140 could be mounted on a sledge movable along the vertical member of frame 150. Horizontal movement could be achieved by providing the vertical member of frame 140 to be horizontally movable along the horizontal member of frame 150. This is not explicitly shown in FIG. 1.

Mirror 120 is provided to be pivotable about a horizontal axis extending essentially along its horizontal length, i.e. extending parallel to for example the upper horizontally extending edge 20c of container body 20. In FIG. 1, mirror 12 is fixedly attached to a pivoting mechanism 121 adapted to provide pivoting movement of mirror 12 about such a horizontal axis.

The mirror 120 and the camera 140 are arranged such that a mirror image of valve members 22 provided on/in inner surface 20b of container body 20 can be captured simultaneously with an image of the front surface 20a of the container body.

Figure 2:
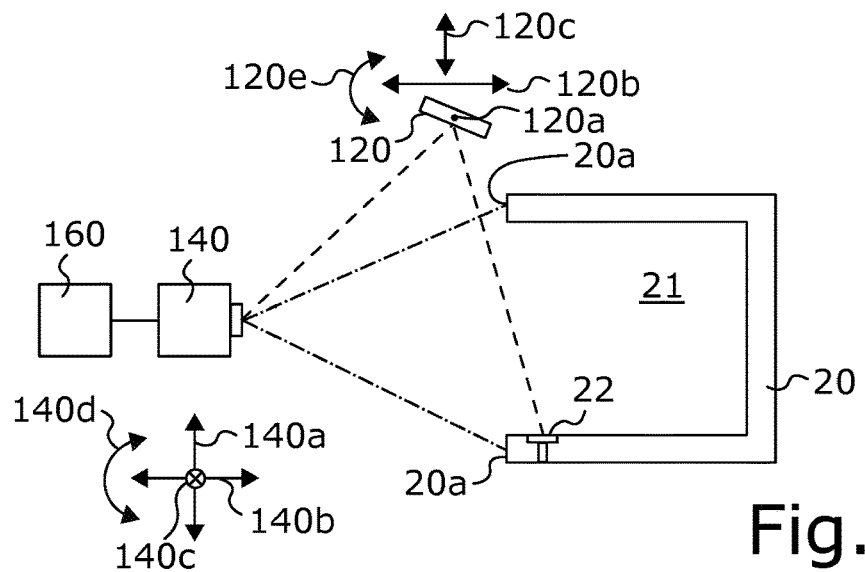
FIG. 2 shows a schematically simplified side view of the inspection system according to FIG. 1.

A typical positioning of mirror 120 is shown in FIG. 2, in which a simplified side sectional view of the inspection system of FIG. 1 is shown. Here, a pivoting axis 120a of mirror 120 is schematically shown which allows a pivoting movement as indicated by curved arrow 120c. Be it noted that such a pivoting axis, about which the mirror is pivotable without any translational movement, can be realised with a pivoting mechanism 121 as shown in FIG. 1. However, it is also possible to provide such a pivotal movement together with a small translational movement due to the specific construction of pivoting mechanism 121. Also, by means of arrows 120b, 120c the directions of a possible translational movement of mirror 120 are indicated. As can be seen, mirror 120 is, in a horizontal direction (indicated by arrow 120b) positioned slightly in front of container body 20 relative to camera 140. By choosing the correct orientation of mirror 120 about axis 120a, light emanating from valve members 22a on the inner lower surface of container body 20 can be reflected to be captured by camera 140 (as indicated by dashed lines). At the same time, camera 140 can capture an image of the front surface 20a of container body 20, as indicated by dash-dotted lines. This simultaneous capture of images of a horizontally extending surface (inner surface 20b) and a vertically extending surface (front surface 20a) leads to a faster and more effective inspection of a container body 20 compared to previous solutions.

It is noted that camera 140 can also be provided to be movable in a translational or pivotal manner, as indicated by arrows 140a, 140b (representing translational movement in x and y direction), circle 140c (representing translational movement in z direction, i.e. into or out of the drawing layer) and curved arrow 140d (representing pivotal movement about an axis in z direction). As mentioned above, further pivotal movement about other axes, for example, axes extending in x and y direction, are conceivable.

In FIG. 2, evaluation unit 160, by which images captured by camera 140 can be evaluated, for example by image analysis, is schematically shown. Evaluation unit 160 can also be configured and adapted to control movement of camera 140 and/or mirror 120.

Figure 3:
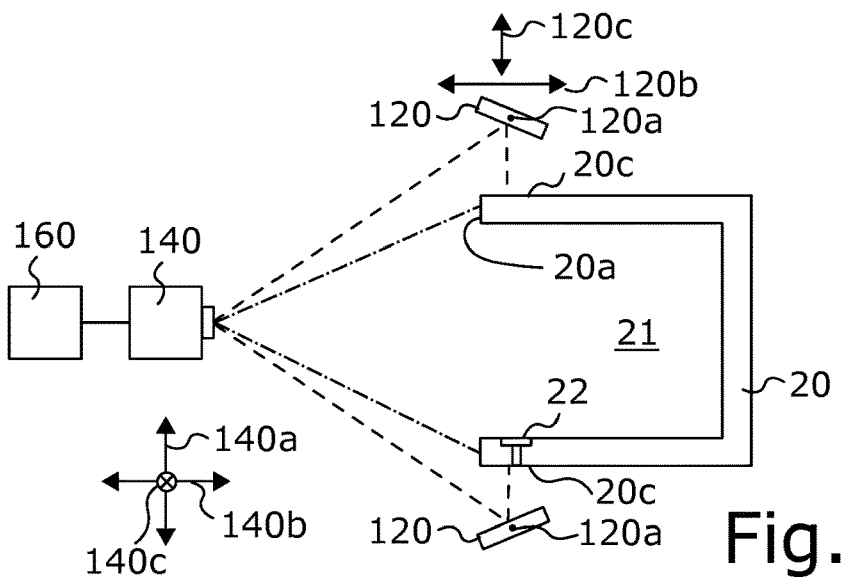
FIG. 3 shows a schematically simplified side view of a further aspect of the inspection system according to the present disclosure.
Figure 4:
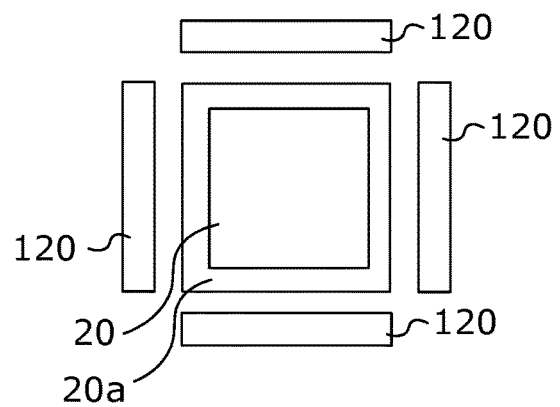
FIG. 4 shows a front view of the inspection system according to FIG. 3.

FIGS. 3 and 4 show a further aspect of an inspection system according to the present disclosure. Here, four mirrors 120 are provided around container body 20, as indicated in FIG. 4. In FIG. 3, only the upper and lower of these mirrors 120 are shown.

In this aspect, mirrors 120 are arranged such that camera 140 can capture an image of the outer surfaces 20c of container body 20. To achieve this, compared to the aspect of FIGS. 1 and 2, the mirrors 120 are, in a horizontal direction, arranged above or at the side of container body 20 relative to camera 140. Again, by setting a correct angle about pivoting axis 120a, images of said outer surfaces 20c can be captured by camera 140 (as indicated by dashed lines). Simultaneously, camera 140 can capture images of front surface 20a, again indicated by dash-dotted lines.

It is noted that the aspect of FIGS. 1 and 2 as well as of FIGS. 3 and 4 can be provided by the same inspection system. In the first case, corresponding to the aspect of FIGS. 1 and 2, only one mirror 120 is used, whereas in the second case, as shown in FIGS. 3 and 4, a multitude of mirrors 120 is used.

Figure 5:
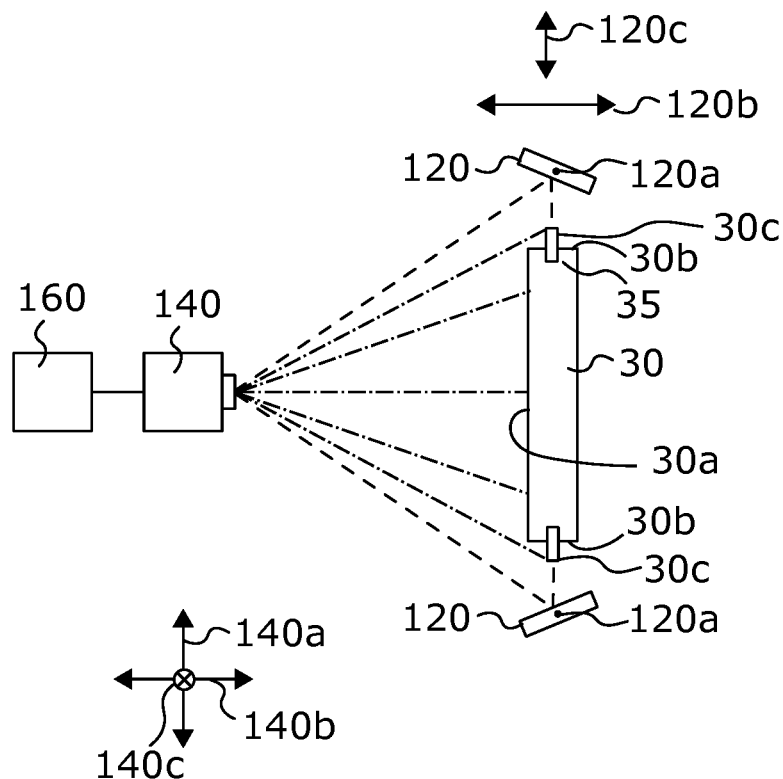
FIG. 5 shows a further application of the inspection system according to FIGS. 3 and 4.
Figure 6:
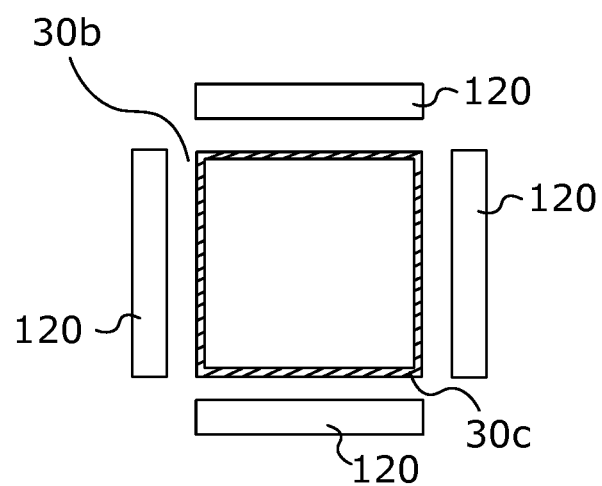
FIG. 6 shows a front view of the inspection system according to FIGS. 3 to 5 performing the application of FIG. 5.

The inspection system of FIGS. 3 and 4 can also be utilized to inspect a lid member 30, which is configured and adapted to close the opening of container body 20, as described above. In FIG. 5 and FIG. 6, such a lid member 30 is shown together with an inspection system which essentially corresponds to that of FIGS. 3 and 4.

Lid member 30 comprises a front surface 30a as well as an outer surface 30b. This is provided with a groove 35, which extends along the whole circumference of outer surface 30b, i.e. around the whole circumference of lid member 30. In this groove 35 there is provided a gasket member 30c, which also extends around the complete circumference of lid member 30. In order to ensure a sealing interaction between lid member 30 and container body 20, it is of great importance that gasket member 30c has no defects. For example, it must be ensured that gasket member 30c is correctly fitted within groove 35, and/or has no defects in itself. With the inspection system of the present invention, gasket 30c can be inspected in a top view, using mirrors 120, as indicated by dashed lines, and at the same time in a front view, as indicated by dash-dotted lines. At the same time, the front surface of the lid 30a can also be inspected, again indicated by dash-dotted lines.

As indicated above, the inspection system according to FIG. 5 and FIG. 6 essentially corresponds to that of the previous figures. The same inspection system may be adapted for the various purposes as described above by translational and/or pivotal positioning of mirrors 120 and/or camera 140.

Be it noted that entire contents of European patent application entitled "Method for inspecting a container and inspection system", which was filed with the European Patent Office under EP application number 17175062.3 on the same date as the present application, relating to a method for inspecting a container body and an inspection system for inspecting container body, especially contents relating to the reflector element and associated apparatus and methods, which are herby incorporated by reference, may be used in conjunction with the inspection system and methods described and/or claimed in the present application.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A substrate container inspection system configured to inspect a plurality of surfaces of one or more of a substrate container and container components of the substrate container, the inspection system comprising:
   more than one mirror configured such that each different mirror of the more than one mirror effects a simultaneous viewing, with a common camera, of an image of separate and disparate portions of the one or more of a substrate container and container components of the substrate container comprising at least a first one and a second one of the plurality of surfaces of the one or more of the substrate container and each container component of the container components.

2. The substrate container inspection system according to claim 1, wherein the substrate container or the component comprises a front surface and a plurality of inner and/or outer side surfaces, and the more than one mirror is arranged to provide a simultaneous view of the front surface and at least one of the plurality of side surfaces.

3. The substrate container inspection system according to claim 1, wherein the more than one mirror is provided to be movable relative to the substrate container or the component in a translational and/or pivotable manner.

4. The substrate container inspection system according to claim 1, comprising the camera configured to commonly capture the image of a simultaneous view of at least the first one and the second one of the plurality of surfaces.

5. The substrate container inspection system according to claim 4, wherein the camera is configured to capture an image of the front surface and at least one of the plurality of side surfaces.

6. The substrate container inspection system according to claim 4, wherein the at least one camera is provided as a line scan camera or an area scan camera.

7. The substrate container inspection system according to claim 4, wherein the camera is provided to be movable relative to the substrate container or the component in a translational and/or pivotable manner.

8. The substrate container inspection system according to claim 4, comprising an evaluating unit configured to evaluate the state of the substrate container or the component on the basis of at least one image captured by the camera.

9. The substrate container inspection system according to claim 8, wherein the evaluating unit is configured to provide an image analysis of the at least one image captured by the camera.

10. The substrate container inspection system according to claim 1, configured to inspect a front opening unified pod (FOUP), especially a body member and/or a lid member of a FOUP.

11. A method for inspecting a plurality of surfaces of one or more of a substrate container and container components of the substrate container, the method comprising the steps of:
   positioning the substrate container at or in the vicinity of an inspection system comprising more than one mirror configured such that each different mirror of the more than one mirror effects a simultaneous viewing, with a common camera, of an image of separate and disparate portions of the one or more of a substrate container and container components of the substrate container comprising at least a first one and a second one of the plurality of surfaces of the one or more of the substrate container and each container component of the container components,
   capturing the image of the simultaneous view of the first one and the second one of the plurality of surfaces with the common camera,
   evaluating the state of the substrate container and the container components with an evaluation unit configured to evaluate the state of the substrate container and the container components on the basis of at least one image captured by the camera.

12. The method according to claim 11, further utilizing a substrate container inspection system according to claim 1.

* * * * *